US007138465B2

(12) United States Patent
Gloeckner et al.

(10) Patent No.: US 7,138,465 B2
(45) Date of Patent: Nov. 21, 2006

(54) POLYMER-MODIFIED RESINS

(75) Inventors: Patrick Gloeckner, Ratingen (DE); Giselher Franzmann, Witten (DE); Joern-Volker Weiss, Haltern am See (DE)

(73) Assignee: Degussa AG, Duesseldorf (DE)

( * ) Notice: Subject to any disclaimer, the term of this patent is extended or adjusted under 35 U.S.C. 154(b) by 296 days.

(21) Appl. No.: 10/718,523

(22) Filed: Nov. 24, 2003

(65) Prior Publication Data

US 2004/0116604 A1 Jun. 17, 2004

(30) Foreign Application Priority Data

Dec. 14, 2002 (DE) ................. 102 58 574

(51) Int. Cl.
*C08L 67/01* (2006.01)
(52) U.S. Cl. ...................... 525/445; 525/165; 525/173; 525/176; 526/319; 526/320
(58) Field of Classification Search ............ None
See application file for complete search history.

(56) References Cited

U.S. PATENT DOCUMENTS

| 4,524,176 | A | * | 6/1985 | Pike et al. ............... 525/12 |
| 5,036,134 | A | * | 7/1991 | Kunz et al. .............. 524/560 |
| 5,385,957 | A | * | 1/1995 | Tobias et al. ............ 523/161 |
| 5,543,219 | A | * | 8/1996 | Elwakil ................ 428/402.24 |
| 6,048,936 | A | * | 4/2000 | Epple et al. ............. 525/124 |
| 6,150,486 | A | * | 11/2000 | Schwede et al. ........... 526/213 |
| 7,084,214 | B1 | * | 8/2006 | Shiga et al. .............. 525/438 |
| 2001/0041772 | A1 | * | 11/2001 | Masubuchi et al. ......... 525/107 |

FOREIGN PATENT DOCUMENTS

| FR | 1 171 235 | | | 1/1959 |
| GB | 1321488 | A | * | 6/1973 |
| JP | 04036364 | A | * | 2/1992 |

OTHER PUBLICATIONS

English Translation of JP 09-124524, Shigeaki et al., May 1997 obtained from JPO Website.*
Derwent Abstract of JP-04-036364, Feb. 1992.*
Abstract of JP 04-036364, Feb. 1992, obtained from the JPO Web-site.*
U.S. Appl. No. 10/718,523, filed Nov. 24, 2003, Gloeckner et al.
U.S. Appl. No. 10/732,514, filed Dec. 11, 2003, Gloeckner et al.

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

Binders for coating materials that exhibit high flexibility and good hardness contain a polymer-modified resin, containing I) at least one polyester having a hydroxyl group or a carboxyl group or both, and II) at least one glycidyl-containing polyacrylate. The polyester I contains an alcohol component containing of from 0.5 to 80 mol % of a dicidol fraction, and the resin is obtained by free-radical polymerization of the starting component(s) for the preparation of the polyacrylate II in the presence of the polyester I in at least one organic solvent.

30 Claims, No Drawings

US 7,138,465 B2

POLYMER-MODIFIED RESINS

BACKGROUND OF THE INVENTION

1. Field of the Invention

The present invention relates to a polymer-modified resin comprising a hydroxy-functional and/or carboxy-functional polyester with dicidol in the alcohol component and a glycidyl-containing, optionally hydroxy-functional or carboxyl-containing polyacrylate.

2. Description of the Related Art

Different polymers are normally miscible with one another only with great difficulty if at all, since the Gibbs's mixing enthalpy of polymers is generally positive. This is one reason why polyesters are often immiscible and incompatible with polyacrylates. By the polymerization of acrylic monomers into a polyester matrix, however, it is possible to prepare stable mixtures.

EP 0 184 761 describes a low molecular mass liquid reaction product of a hydroxyl-containing polyacrylate prepared in a polyester polyol. A disadvantage of such products is the low molecular weight and the associated unsatisfactory adhesion to substrates. EP 206 072 describes a semicontinuous process for preparing the abovementioned products at a temperature of at least 150° C.

EP 0 896 991 describes an acrylic copolymer in which the fraction of the copolymer, which is composed of a polyester, is below 10%. The polyester described possesses OH numbers of between 50 and 350 mg KOH/g and acid numbers of between 1 and 50 mg KOH/g.

EP 0 607 792 discloses water-dilutable polyester-polyacrylate polymers in which the polyacrylate is prepared free-radically from its monomers in the presence of the polyester. The polyesters used are likewise of relatively low molecular mass, since the OH numbers are between 100 and 600 mg KOH/g and the acid numbers are between 0 and 15 mg KOH/g.

As experience has shown, the low molecular weight, owing to the relatively high OH numbers and acid numbers of such polyesters, leads to poor adhesion properties on substrates and also to poorer mechanical properties such as flexibility, for example.

EP 0 541 604 (WO 92/02590) discloses coating compositions based on hydroxyl-containing binders formed from polyesters and polyacrylates, the polyacrylates being prepared at least partly in the polyester and there being isocyanate crosslinkers present.

In accordance with the same preparation principle, EP 0 776 920 (DE 195 44 737) describes special polyester-acrylate-based binders.

None of these patents uses dicidol-containing polyesters.

SUMMARY OF THE INVENTION

It is an object of the present invention to provide novel polyester-polyacrylate compositions which combine the advantages of the polyacrylates and the polyesters. It is an object to provide compositions which can be used as a binder component in coating materials to give coatings which possess a high flexibility in conjunction with very good hardness. At the same time the adhesion of the coating to substrates should be very high. In addition the products ought to give high hiding power to pigmented coating materials and high degrees of gloss to the resultant coatings, and also a high filling power. A further object of the present invention was to find polyester-polyacrylates which give coatings of high chemical resistance, good sterilization resistance, and a very high weathering stability. Another object of the present invention is to make the overall system less expensive through the use of acrylic base materials, which are less expensive than polyester raw materials.

This and other objects have been achieved by the present invention the first embodiment of which includes a polymer-modified resin, comprising:

I) at least one polyester having a hydroxyl group or a carboxyl group or both, and II) at least one glycidyl-containing polyacrylate, wherein said polyester I comprises an alcohol component containing of from 0.5 to 80 mol % of a dicidol fraction, and wherein said resin is obtained by free-radical polymerization of the starting component(s) for the preparation of said polyacrylate II in the presence of the polyester I in at least one organic solvent.

In another embodiment the present invention provides for a process for preparing a polymer-modified resin, comprising:

free-radical polymerizing ethylenically unsaturated monomers in the presence of a) at least one polyester having a hydroxyl group or a carboxyl group and b) at least one organic solvent, to obtain at least one glycidyl-containing polyacrylate; and wherein said polyester comprises an alcohol component containing of from 0.5 to 80 mol % of dicidol.

DETAILED DESCRIPTION OF THE INVENTION

It has been found that the polymer-modified resins of the present invention meet the stated criteria. A particular surprise was that the specific alcohol component dicidol made it possible to exert a positive influence on the properties of these resins. Likewise a surprise was that through the use of dicidol it was possible to raise the hardness of the coatings obtained without too great a reduction in the flexibility. Moreover, the use of dicidol has positive effects for adhesion, gloss, and chemical resistance.

The present invention provides polymer-modified resins comprising

I. at least one hydroxyl-functional or carboxy-functional polyester, and

II. at least one glycidyl-containing polyacrylate, wherein the polyester I contains a fraction of dicidol in the alcohol component of from 0.5 to 80 mol %, and the resin is obtained by free-radical polymerization of the starting component(s) for the preparation of II in the presence of the polyester I in at least one organic solvent.

The fraction of dicidol in the alcohol component of polyester I includes all values and subvalues therebetween, especially including 1, 2, 3, 4, 5, 10, 15, 20, 25, 30, 35, 40, 45, 50, 55, 60, 65, 70 and 75 mol %.

Where appropriate, the polyacrylate II as well may also contain hydroxyl and/or carboxyl groups.

The polyester I of the present invention is prepared in accordance with known methods by condensation. The polyester used comprises a dicarboxylic and/or polycarboxylic acid mixture and a diol or polyol mixture. Preferably, fractions of the dicarboxylic and/or polycarboxylic acid mixture can be replaced in part with monocarboxylic acids.

In detail, it is possible to use customary carboxylic acids and their anhydrides and also esterifiable derivatives, such as phthalic acid, isophthalic acid, terephthalic acid, 1,2- and 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid and/or trimellitic acid, their anhydrides and/or low alkyl esters such as methyl esters, for example. These compounds may be used alone or in combination.

Preferred are phthalic acid, isophthalic acid, terephthalic acid and 1,2-cyclohexanedicarboxylic acid, adipic acid, succinic acid, dodecanedioic acid, sebacic acid, and their anhydrides and/or esterifiable derivatives.

As a component essential to the present invention the polyester contains from 0.5 to 80 mol %, preferably from 1 to 50 mol %, more preferably from 3 to 25 mol %, of dicidol in the alcohol component.

In principle it is possible to use any desired industrially preparable dicidol mixtures (XY-bis(hydroxymethyl)tricyclo[5.2.2.0$^{2,6}$]decane and/or trimeric and/or higher isomeric dicidols of the Diels-Alder reaction product of cyclopentadiene).

The dicidol used contains preferably a mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]-decane and 5,8-bis(hydroxymethyl)tricyclo[5.2.1.0$^{2,6}$]decane, it being possible for each isomer to be present in a fraction of from 20 to 40% by weight in the mixture, and the sum of the three isomers being from 90 to 100% by weight. The amount of each isomer includes all values and subvalues therebetween, especially including 22, 24, 26, 28, 30, 32, 34, 36 and 38% by weight.

It is also possible for up to 10% by weight of further isomers of dicidol and/or trimeric and/or higher isomeric dicidols of the Diels-Alder reaction product of cyclopentadiene to be present. The amount of further isomers includes all values and subvalues between 0 and 10% by weight, especially including 1, 2, 3, 4, 5, 6, 7, 8 and 9% by weight.

Examples of further alcohols used include ethylene glycol, 1,2- and/or 1,3-propanediol, diethylene, dipropylene, triethylene and tetraethylene glycol, 1,2- and/or 1,4-butanediol, 1,3-butylethylpropanediol, 1,3-methylpropanediol, 1,5-pentanediol, cyclohexanedimethanol, glycerol, hexanediol, neopentylglycol, trimethylolethane, trimethylolpropane and/or pentaerythritol, bisphenol A, B, C, F, norbomylene glycol, 1,4-benzyldimethanol and -ethanol, and 2,4-dimethyl-2-ethylhexane-1,3-diol, preferably 1,4-butanediol, cyclohexanedimethanol, hexanediol, neopentylglycol, trimethylolpropane, ethylene glycol. The additional alcohols may be used alone or in combination.

In one preferred embodiment, the composition of the polyester I is as follows:

| mol % | ingredients |
|---|---|
| acid component | |
| 60–100 | (cyclo)aliphatic dicarboxylic acids |
| 0–40 | aromatic dicarboxylic acid |
| 0–40 | further (cyclo)aliphatic dicarboxylic acid |
| 0–10 | higher polyfunctional carboxylic acid |
| alcohol component | |
| 10–60 | neopentylglycol |
| 10–60 | monoethylene glycol |
| 0–20 | trimethylolpropane |
| 0.5 to 80 | Dicidol |
| 0–79.5 | further (cyclo)aliphatic alcohol component | and the sum of the acid component and that of the alcohol component each on its own adds up to 100 mol %.

In one very preferred embodiment the composition of the polyester I. is as follows:

| mol % | ingredients |
|---|---|
| acid component | |
| 60–100 | 1,2-cyclohexanedicarboxylic anhydride |
| 0–40 | aromatic dicarboxylic acid |
| 0–40 | further (cyclo)aliphatic dicarboxylic acid |
| 0–10 | higher polyfunctional carboxylic acid |
| alcohol component | |
| 10–60 | neopentylglycol |
| 10–60 | monoethylene glycol |
| 0–20 | trimethylolpropane |
| 0.5 to 80 | Dicidol |
| 0–79.5 | further (cyclo)aliphatic alcohol component |

The sum of the acid component and that of the alcohol component is in each case, on its own, 100 mol %.

The polyester is prepared by esterifying the acid components with the alcohol components and subsequently carrying out polycondensation. To this end the constituents are mixed and slowly heated (melted), with esterification then taking place with elimination of water. The preferred reaction temperature lies between 180 and 260° C. The reaction temperature includes all values and subvalues therebetween, especially including 190, 200, 210, 220, 230, 240 and 250° C. In the end phase vacuum is applied, so that diols as well are eliminated and the molecular weight is markedly increased. In part it is possible to use catalysts. Final characteristic values used are acid number and OH number.

The polyester specified under I possesses an OH number of from 3 to 250 mg KOH/g, preferably from 10 to 150 mg KOH/g, more preferably from 30 to 50 mg KOH/g, an acid number of from 0 to 30 mg KOH/g, preferably from 0 to 5 mg KOH/g, more preferably from 0 to 2 mg KOH/g, a Tg of from −30 to +100° C., preferably from −20 to +40° C., more preferably from −10 to +20° C., a dynamic viscosity as a 75% strength solution in Solvesso® 150 of from 1 to 40 Pa·s, preferably from 1 to 20, more preferably from 1 to 10, an OH functionality (branching) of from 1 to 10, preferably from 2 to 5, more preferably from 2 to 4.

The OH number includes all values and subvalues therebetween, especially including 10, 20, 30, 40, 50, 60, 70, 80, 90, 100, 110, 120, 140, 150, 160, 170, 180, 190, 200, 210, 220, 230 and 240 mg KOH/g. The acid number includes all values and subvalues therebetween, especially including 5, 10, 15, 20 and 25 mg KOH/g. The Tg includes all values and subvalues therebetween especially including −20, −10, 0, 10, 20, 30, 40, 50, 60, 70, 80 and 90° C. The dynamic viscosity includes all values and subvalues therebetween, especially including 5, 10, 15, 20, 25, 30 and 35 Pa·s. The OH functionality (branching) includes all values and subvalues therebetween, especially including 2, 3, 4, 5, 6, 7, 8 and 9.

The polyacrylate II. contains glycidyl groups and optionally also hydroxy groups and/or carboxyl groups and can be a copolymer of ethylenically unsaturated monomers, as described in DE 199 63 586.

Monomers used with preference are, besides glycidyl-containing monomers, styrene, acrylic acid and/or methacrylic acid, $C_1$–$C_{40}$ alkyl esters of methacrylic acid and/or acrylic acid, hydroxyalkyl acrylates and/or hydroxyalkyl methacrylates.

Monomers used with particular preference are glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate, styrene, acrylic acid and/or methacrylic acid, methyl methacrylate, 2-hydroxyethyl acrylate, 2-hydroxyethyl methacrylate, butyl acrylate and/or butyl methacrylate.

In selecting the monomers a fundamental point is using at least one monomer for preparing the polyacrylates II that has glycidyl groups and, where appropriate, hydroxy and/or carboxy groups, in order to achieve the epoxide oxygen contents, OH numbers and acid numbers that are specified below.

The polyacrylate II possesses an OH number of from 0 to 300 mg KOH/g, preferably from 20 to 150 mg KOH/g, more preferably from 40 to 140 mg KOH/g, an acid number of from 0 to 300 mg KOH/g, preferably from 0 to 50 mg KOH/g, more preferably from 0 to 20 mg KOH/g, an epoxidically attached oxygen content of from 0.05 to 10%, preferably from 0.3 to 3%, more preferably from 0.3 to 2% by weight, a Tg of from −40 to +120° C., preferably from −30 to +40° C., more preferably from −20 to +30° C., a dynamic viscosity as a 60% solution in Solvesso® 150 of from 0.2 to 40 Pa·s, preferably from 0.5 to 15, more preferably from 0.5 to 10 Pa·s, an Mn of from 1 000 to 100 000 g/mol, preferably from 1 000 to 10 000 g/mol, more preferably from 1 000 to 6 000 g/mol, an Mw of from 2 000 to 1 000 000 g/mol, preferably from 3 000 to 100 000 g/mol, more preferably from 5 000 to 20 000 g/mol.

The OH number includes all values and subvalues therebetween, especially including 10, 20, 30, 40, 50, 60, 70, 80, 90, 100, 110, 120, 130, 140, 150, 160, 170, 180, 190, 200, 210, 220, 230, 240, 250, 260, 270, 280 and 290 mg KOH/g. The acid number includes all values and subvalues therebetween, especially including 10, 20, 30, 40, 50, 60, 70, 80, 90, 100, 110, 120, 130, 140, 150, 160, 170, 180, 190, 200, 210, 220, 230, 240, 250, 260, 270, 280 and 290 mg KOH/g. The oxygen content includes all values and subvalues therebetween, especially including 0.1, 0.5, 1, 1.5, 2, 2.5, 3, 3.5, 4, 4.5, 5, 5.5, 6, 6.5, 7, 7.5, 8, 8.5, 9 and 9.5% by weight. The Tg includes all values and subvalues therebetween, especially including −30, −20, −10, 0, 10, 20, 30, 40, 50, 60, 70, 80, 90, 100 and 110° C. The dynamic viscosity includes all values and subvalues therebetween, especially including 0.5, 1, 5, 10, 15, 20, 25, 30 and 35 Pa·s. The Mn includes all values and subvalues therebetween, especially including 1000, 2000, 3000, 4000, 5000, 10,000, 15,000, 20,000, 25,000, 30,000, 40,000, 45,000, 50,000, 55,000, 60,000, 65,000, 70,000, 75,000, 80,000, 85,000, 90,000 and 95,000 g/mol. The Mw includes all values and subvalues therebetween, especially including 3000, 4000, 5000, 10,000, 15,000, 20,000, 25,000, 30,000, and 40,000, 45,000, 50,000, 55,000, 60,000, 65,000, 70,000, 75,000, 80,000, 85,000, 90,000 and 95,000 g/mol.

In one preferred embodiment, A, the polyacrylate specified under II contains the following raw materials:

| mol % | monomer |
|---|---|
| 10–40 | butyl acrylate and/or butyl methacrylate |
| 10–40 | glycidyl methacrylate and/or (meth)acrylic acid |
| 10–80 | methyl methacrylate |
| 0–50 | styrene |
| 0–70 | further α,β-unsaturated monomers |

In one preferred embodiment, B, the polyacrylate specified under II contains the following raw materials:

| mol % | monomer |
|---|---|
| 10–40 | butyl acrylate and/or butyl methacrylate |
| 10–40 | glycidyl methacrylate and/or (meth)acrylic acid |
| 10–80 | methyl methacrylate |
| 5–40 | hydroxyethyl acrylate and/or hydroxyethyl methacrylate |
| 0–40 | acrylic acid and/or methacrylic acid |
| 0–50 | styrene |
| 0–65 | further α,β-unsaturated monomers |

The polymer-modified resins from I and II are prepared by initially introducing the dicidol-containing polyester described under I as a solution in an organic solvent or in a solvent mixture. This initial charge is heated in a nitrogen atmosphere with stirring to a preferred temperature of from 100 to 200° C., more preferably from 120 to 180° C., and very preferably from 120 to 160° C. The temperature of the initial charge includes all values and subvalues therebetween, especially including 110, 120, 130, 140, 150, 160, 170, 180 and 190° C. Then a monomer mixture (as described under II), in which initiators (from the group consisting of peroxides, hydroperoxides, azo compounds and/or CC-cleaving compounds) have been dissolved beforehand, is added in over the course of 2–6 hours. After about 2 more hours of stirring at reaction temperature a further small amount of initiator is added and stirring is continued for 2 to 4 hours more.

The result is a resin mixture which is homogeneously soluble in organic solvents and whose solids fraction (from 99 to 30% by weight, preferably 85 to 50% by weight, more preferably from 80 to 65% by weight) comprises of from 10 to 90% by weight, preferably from 30 to 80% by weight, more preferably from 60 to 80% by weight, of polymer I (polyester) and of from 90 to 10% by weight, preferably from 70 to 20% by weight, more preferably from 40 to 20% by weight, of polymer II (polyacrylate). The amount of solid fraction of the main mixture includes all values and subvalues therebetween, especially including 35, 40, 45, 50, 55, 60, 65, 70, 75, 80, 85, 90 and 95% by weight. The amount of polymer I includes all values and subvalues therebetween, especially including 20, 30, 40, 50, 60, 70 and 90% by weight. The amount of polymer II includes all values and subvalues therebetween, especially including 20, 30, 40, 50, 60, 70 and 90% by weight.

Examples of preferred solvents are butylacetate, xylene, Solvesso® 100 and/or Solvesso® 150 and/or Solvesso® 200 (aromatics-containing solvent mixture).

The polymer-modified resins of the present invention have an OH number of from 0 to 250 mg KOH/g, preferably from 20 to 150 mg KOH/g, more preferably from 40 to 140 mg KOH/g, an acid number of from 0 to 200 mg KOH/g, preferably from 0 to 50 mg KOH/g, more preferably from 0 to 20 mg KOH/g, a Tg of from −40 to +120° C., preferably from −30 to +40° C., more preferably from −20 to +30° C., a dynamic viscosity as a 60% solution in Solvesso® 150 of 0.2–40 Pa·s, preferably from 0.5 to 15 Pa·s, more preferably from 0.5 to 10 Pa·s.

The OH number includes all values and subvalues therebetween, especially including 10, 20, 30, 40, 50, 60, 70, 80, 90, 10, 110, 120, 130, 140, 150, 160, 170, 180, 190, 200, 210, 220, 230 and 240 mg KOH/g. The acid number includes all values and subvalues therebetween, especially including 10, 20, 30, 40, 50, 60, 70, 80, 90, 10, 110, 120, 130, 140, 150, 160, 170, 180, and 190 mg KOH/g. The Tg includes all values and subvalues therebetween, especially including −30, −20, −10, 0, 10, 20, 30, 40, 50, 60, 70, 80, 90, 100 and 110° C. The dynamic viscosity includes all values and subvalues therebetween, especially including 0.5, 1, 1.5, 2, 2.5, 5, 10, 15, 20, 25, 30 and 35 Pa·s.

The polymer-modified resins of the present invention are used in coating compositions and adhesives as binders and are preferably crosslinked with polycarboxylic acids and anhydrides, polyamines and/or amine-formaldehyde resins or polyisocyanates.

The present invention accordingly also provides for the use of the polymer-modified resins as binders in adhesives and coating compositions.

Having generally described this invention, a further understanding can be obtained by reference to certain specific examples which are provided herein for purposes of illustration only, and are not intended to be limiting unless otherwise specified.

EXAMPLES

The mole percentages of the carboxylic acid component and of the alcohol component are separately standardized to 100 mol %. The sum of the moles of alcohol is greater for a hydroxyfunctional polyester than the sum of the moles of the carboxylic acid component.

Example 1

Preparation of Polyester I., Dicidol-containing 560 g of 1,2-cyclohexanedicarboxylic anhydride and 80 g of sebacic acid were admixed with 90 g of ethylene glycol, 80 g of dicidol, 160 g of neopentylglycol, 50 g of 1,6-hexanediol and 60 g of trimethylolpropane and the mixture was melted and reacted in a nitrogen atmosphere at temperatures of up to 245° C. until about 95% of the theoretically calculated amount of water had been distilled off. Then reduced pressure was applied and condensation was carried out to an OH number of 55 mg KOH/g and an acid number of below 1 mg KOH/g. The polyester melt was converted to a 75% strength solution in Solvesso® 150.

Final characteristics:
OH number=55 mg KOH/g,
acid number<1 mg KOH/g,
Mn=4 200 g/mol,
Glass transition temperature=+14° C.,
Dynamic viscosity, 75% in Solvesso® 150 at 23° C.=28 Pa·s.

Example A) (Comparative)

Preparation of Polyester, Dicidol-free 580 g of 1,2-cyclohexanedicarboxylic anhydride and 90 g of sebacic acid were admixed with 110 g of ethylene glycol, 160 g of neopentylglycol, 80 g of 1,6-hexanediol and 60 g of trimethylolpropane and the mixture was melted and reacted in a nitrogen atmosphere at temperatures of up to 245° C. until about 95% of the theoretically calculated amount of water had been distilled off. Then reduced pressure was applied and condensation was carried out to an OH number of 55 mg KOH/g and an acid number of below 1 mg KOH/g. The polyester melt was converted to a 75% strength solution in Solvesso® 150.

Final characteristics:
OH number=54 mg KOH/g,
acid number<1 mg KOH/g,
Mn=4 100 g/mol,
Glass transition temperature=0° C.,
Dynamic viscosity, 75% in Solvesso® 150 at 23° C.=29 Pa·s.

Preparation of the Resins

Example 2

540 g of the polyester solution from Example 1.) and 210 g of Solvesso® 150 were introduced as an initial charge and heated with stirring to T=145° C. under a gentle stream of nitrogen.

Then a mixture consisting of 35.7 g of butyl acrylate, 69.7 g of glycidyl methacrylate, 101.1 g of methyl methacrylate, 14.5 g of Solvesso® 150, 6.6 g of di-tert-butyl peroxide and 7.0 g of dicumyl peroxide was added dropwise continuously with stirring over the course of 6 hours.

The batch was postpolymerized at 145° C. for 4 hours, then cooled to T=50° C. and the solution was freed from impurities over a filter sieve.

Final characteristics:
Epoxide content: 1.3% by weight of epoxidically attached oxygen,
Acid number<1 mg KOH/g,
Nonvolatiles content: 63% by weight,
Dynamic viscosity, 63% in Solvesso® 150 at 23° C.=1 600 mPa·s.

Example B) (Comparative)

540 g of the polyester solution from Example A) and 210 g of Solvesso® 150 were introduced as an initial charge and heated with stirring to T=145° C. under a gentle stream of nitrogen. Then a mixture consisting of 35.7 g of butyl acrylate, 69.7 g of glycidyl methacrylate, 101.1 g of methyl methacrylate, 14.5 g of Solvesso® 150, 6.6 g of di-tert-butyl peroxide and 7.0 g of dicumyl peroxide was added dropwise continuously with stirring over the course of 6 hours. The batch was postpolymerized at 145° C. for 4 hours, then cooled to T=50° C. and the solution was freed from impurities over a filter sieve.

Final characteristics:
Epoxide content: 1.2% by weight of epoxidically attached oxygen,
Acid number<1 mg KOH/g,
Nonvolatiles content: 64% by weight,
Dynamic viscosity, 63% in Solvesso® 150 at 23° C.=1 850 mPa·s, Coating Materials 65.0% by weight of the solution of Example A) or, respectively, of the solution from Example B) were introduced as an initial charge. With the dissolver running, 7.5% by weight of Cymel 303 (methylolated melamine-formaldehyde resin, Cytec), 0.8% by weight of catalyst Dynapol BL 1203 (Degussa AG) and 6.0% by weight of dodecanedioic acid were slowly added. Using 10.0% by weight of methoxypropyl acetate, 3.2% by weight of butyl acetate and 7.5% by weight of butanol a DIN efflux time of approximately 100 s±10 s was set.

The two coating materials were drawn down onto aluminum panels (0.57 mm) using a 40 μm doctor blade and were baked at 160° C. for 30 minutes (film thickness approximately 18–25 μm).

In both cases the leveling is very good. No differences in this respect can be discerned.

Further results are compiled in the table given below.

|  | Coating material from A), dicidol-containing | Coating material from B), dicidol-free |
|---|---|---|
| Gloss (60°) ISO 2813 | 93 | 82 |
| Adhesion DIN/ISO 2409 | GT 0 | GT 1 |
| Pencil hardness ASTM D3363 | H | HB-F |
| MEK test (double rubs) ASTM D4752-87 | >100 | 50 |
| Soot test (15', 80° C.) | 0–1 | 1 |

German patent application 10258574.1 filed Dec. 14, 2002, is incorporated herein by reference.

Numerous modifications and variations on the present invention are possible in light of the above teachings. It is therefore to be understood that within the scope of the appended claims, the present invention may be practiced otherwise than as specifically described herein.

The invention claimed is:

1. A polymer-modified resin, comprising:
I) at least one hydroxy-functional or carboxy-functional polyester, and
II) at least one glycidyl-containing polyacrylate,
wherein said polyester I comprises an alcohol component containing of from 0.5 to 80 mol % of a dicidol fraction, and
wherein said resin is obtained by free-radical polymerization of the starting component(s) for the preparation of said polyacrylate II in the presence of the polyester I in at least one organic solvent.

2. The polymer-modified resin according to claim 1, wherein said polyester I has an OH number of from 3 to 250 mg KOH/g, an acid number of from 0 to 200 mg KOH/g, a Tg of from −30 to 100° C., a dynamic viscosity, as measured in 75% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 1 to 40 Pa·s, and an OH functionality of from 1 to 10.

3. The polymer-modified resin according to claim 1, wherein said polyester I has an OH number of from 10 to 150 mg KOH/g, an acid number of from 0 to 75 mg KOH/g, a Tg of from −20 to 40° C., a dynamic viscosity, as measured in 75% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 1 to 20 Pa·s, and an OH functionality of from 2 to 5.

4. The polymer-modified resin according to claim 1, wherein said polyester I has an OH number of from 30 to 50 mg KOH/g, an acid number of from 0 to 50 mg KOH/g, a Tg of from −10 to 20° C., a dynamic viscosity, as measured in 75% solution in a hydrocarbon fluid having an aromatics content >99 volume % according to ASTM D 1319, a color of Saybolt 30 according to ASTM D 156, an initial boiling point of 1 86° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 1 to 10 Pa·s, and an OH functionality of from 2 to 4.

5. The polymer-modified resin according to claim 1, wherein said dicidol comprises an isomer mixture of X,Y-bis(hydroxymethyl)tricyclo[5.2.2.0$^{2,6}$]decane.

6. The polymer-modified resin according to claim 1, wherein said dicidol comprises a mixture of the isomeric compounds 3,8-bis(hydroxymethyl)tricycle-[5.2.1.0$^{2,6}$]decane, 4,8-bis(hydroxymethyl)tricyclo[5.2.1.0$^{2,6}$]decane and 5,8-bis(hydroxymethyl) tricyclo[5.2.1.0$^{2,6}$]decane,
wherein each isomer is present in said mixture in a fraction of from 20 to 40% by weight, the sum of the three isomers being from 90 to 100% by weight.

7. The polymer-modified resin as claimed in claim 4, further comprising up to 10% of isomers of dicidol, trimeric isomeric diols of the Diels-Alder reaction product of cyclopentadiene, higher isomeric diols of the Diels-Alder reaction product of cyclopentadiene or mixtures thereof.

8. The polymer-modified resin according to claim 1, wherein the alcohol component of polyester I is a compound selected from the group consisting of ethylene glycol, 1,2-propanediol, 1,3-propanediol, diethylene, dipropylene, triethylene and tetraethylene glycol, 1,2-butanediol, 1,4-butanediol, 1,3-butylethylpropanediol, 1,3-methylpropanediol, 1,5-pentanediol, cyclohexanedimethanol, glycerol, hexanediol, neopentylglycol, trimethylolethane, trimethylolpropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethylhexane-1,3-diol, and mixtures thereof.

9. The polymer-modified resin according to claim 1, wherein the acid component of polyester I is a compound selected from the group consisting of phthalic acid, isophthalic acid, terephthalic acid, 1,2-cyclohexanedicarboxylic acid, 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid, trimellitic acid, anhydride of phthalic acid, anhydride of isophthalic acid, anhydride of terephthalic acid, anhydride of 1,2-cyclohexanedicarboxylic acid, anhydride of 1,4-cyclohexanedicarboxylic acid, anhydride of succinic acid, anhydride of sebacic acid, anhydride of methyltetrahydrophthalic acid, anhydride of methylhexahydrophthalic acid, anhydride of tetrahydrophthalic acid, anhydride of dodecanedioic acid, anhydride of adipic acid, anhydride of azelaic acid, anhydride of naphthalenedicarboxylic acid, anhydride of pyromellitic acid, anhydride of trimellitic acid, lower alkyl esters of phthalic acid, lower alkyl esters of isophthalic acid, lower alkyl esters of terephthalic acid, lower alkyl esters of 1,2-cyclohexanedicarboxylic acid, lower alkyl esters of 1,4-cyclohexanedicarboxylic acid, lower alkyl esters of succinic acid, lower alkyl esters of sebacic acid, lower alkyl esters of methyltetrahydrophthalic acid, lower alkyl esters of methylhexahydrophthalic acid, lower alkyl esters of tetrahydrophthalic acid, lower alkyl esters of dodecanedioic acid, lower alkyl esters of adipic acid, lower alkyl esters of azelaic acid, lower alkyl esters of naphthalenedicarboxylic acid, lower alkyl esters of pyromellitic acid, lower alkyl esters of trimellitic acid, and mixtures thereof.

10. The polymer-modified resin according to claim 1, wherein the polyacrylate II has an OH number of from 0 to 300 mg KOH/g, an acid number of from 0 to 300 mg KOH/g, an epoxidically attached oxygen content of from 0.05 to 10 wt. %, a Tg of from −40 to 120° C., a dynamic viscosity, as measured in 60% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 0.2 to 40 Pa·s, an Mn of from 1 000 to 100 000 g/mol, and an Mw of from 2 000 to 1 000 000 g/mol.

11. The polymer-modified resin according to claim 1, wherein the polyacrylate II has an OH number of from 20 to 150 mg KOH/g, an acid number of from 0 to 50 mg KOH/g, an epoxidically attached oxygen content of from 0.3 to 3.0 wt. %, a Tg of from −30 to 40° C., a dynamic viscosity, as measured in 60% solution in Solvesso® 150, of from 0.5 to 15 Pa·s, an Mn of from 1 000 to 10 000 g/mol, and an Mw of from 3 000 to 100 000 g/mol.

12. The polymer-modified resin according to claim 1, wherein the polyacrylate II has an OH number of from 40 to 140 mg KOH/g, an acid number of from 0 to 20 mg KOH/g, an epoxidically attached oxygen content of from 0.3 to 2.0 wt. %, a Tg of from −20 to 30° C., a dynamic viscosity, as measured in 60% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 0.5 to 10 Pa·s, an Mn of from 1 000 to 6 000 g/mol, and an Mw of from 5 000 to 20 000 g/mol.

13. The polymer-modified resin according to claim 1, wherein the polyacrylate II is prepared from at least one glycidyl-containing monomer and at least one monomer selected from the group consisting of styrene, acrylic acid, methacrylic acid, $C_1-C_{40}$ alkyl esters of methacrylic acid and acrylic acid, hydroxyalkyl acrylates, hydroxyalkyl methacrylates and mixtures thereof.

14. The polymer-modified resin according to claim 1, wherein said starting components are selected from the group consisting of glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate, styrene, acrylic acid, methacrylic acid, methyl methacrylate, 2-hydroxyethyl acrylate, 2-hydroxyethyl methacrylate, butyl acrylate, butyl methacrylate and mixtures thereof.

15. The polymer-modified resin according to claim 1, having an OH number of from 0 to 250 mg KOH/g, an acid number of from 0 to 200 mg KOH/g, an epoxide oxygen content of 0.05 to 10 wt. %, a Tg of from −40 to 120° C., and a dynamic viscosity, as measured in 60% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 0.2 to 40 Pa·s.

16. The polymer-modified resin according to claim 1, having an OH number of from 20 to 150 mg KOH/g, an acid number of from 0 to 50 mg KOH/g, an epoxide oxygen content of 0.3 to 3 wt. %, a Tg of from −30 to 40° C., and a dynamic viscosity, as measured in 60% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 0.5 to 15 Pa·s.

17. The polymer-modified resin according to claim 1, having an OH number of from 40 to 140 mg KOH/g, an acid number of from 0 to 20 mg KOH/g, an epoxide oxygen content of 0.3 to 2 wt. %, a Tg of from −20 to 30° C., and a dynamic viscosity, as measured in 60% solution in a hydrocarbon fluid having an aromatics content >99 volume % according to ASTM D 1319, a color of Saybolt 30 according to ASTM D 156, an initial boiling point of 186° C. and a dry point of 204° C. according to ASTM D 86, a flash point of 66° C. according to ASTM D 56, a Kauri-butanol value of 94 according to ASTM D 1133, and a specific gravity of 0.897 15.6° C./15.6° C. according to ASTM D 4052, of from 0.5 to 10 Pa·s.

18. The polymer-modified resin according to claim 1, comprising:
I.) from 10 to 90% by weight of polyester; and
II.) from 90 to 10% by weight of polyacrylate.

19. The polymer-modified resin according to claim 1, comprising:
I.) from 30 to 80% by weight of polyester; and
II.) from 70 to 20% by weight of polyacrylate.

20. The polymer-modified resin according to claim 1, comprising:
I.) from 60 to 80% by weight of polyester; and
II.) from 40 to 20% by weight of polyacrylate.

21. The polymer-modified resin according to claim 1, wherein the acid component of said polyester I comprises in ester form
60–100 mol % of (cyclo)aliphatic dicarboxylic acids,
0–40 mol % of aromatic dicarboxylic acid,
0–40 mol % of further (cyclo)aliphatic dicarboxylic acid, and
0–10 mol % of higher polyfunctional carboxylic acid; and
wherein the alcohol component of said polyester I comprises in ester form 10–60 mol % of neopentylglycol,
10–60 mol % of monoethylene glycol,
0–20 mol % of trimethylolpropane,
0.5 to 80 mol % of dicidol, and
0–79.5 mol % of further (cyclo)aliphatic alcohol component; and
wherein a sum of the acid components and a sum of the alcohol components each on its own adds up to 100 mol %.

22. The polymer-modified resin according to claim 1, wherein the acid component of said polyester I comprises in ester form
60–100 mol % of 1,2-cyclohexanedicarboxylic anhydride,
0–40 mol % of aromatic dicarboxylic acid,
0–40 mol % of further (cyclo)aliphatic dicarboxylic acid, and
0–10 mol % of higher polyfunctional carboxylic acid; and
wherein the alcohol component of said polyester I comprises in ester form
10–60 mol % of neopentylglycol,
10–60 mol % of monoethylene glycol,
0–20 mol % of trimethylolpropane,
0.5–80 mol % of dicidol, and
0–79.5 mol % of further (cyclo)aliphatic alcohol component.

23. The polymer-modified resin according to claim 1, wherein the polyacrylate II comprises the following monomers in copolymerized form
10–40 mol % of butyl acrylate and/or butyl methacrylate,
10–40 mol % of glycidyl methacrylate and/or (meth) acrylic acid,
10–80 mol % of methyl methacrylate,
0–50 mol % of styrene, and
0–70 mol % of further α,β-unsaturated monomers.

24. The polymer-modified resin according to claim 1, wherein the polyacrylate II comprises the following monomers in copolymerized form
10–40 mol % of butyl acrylate and/or butyl methacrylate,
10–40 mol % of glycidyl methacrylate and/or (meth) acrylic acid,
10–80 mol % of methyl methacrylate,
5–40 mol % of hydroxyethyl acrylate and/or hydroxyethyl methacrylate,
0–40 mol % of acrylic acid and/or methacrylic acid,
0–50 mol % of styrene, and
0–65 mol % of further α,β-unsaturated monomers.

25. A process for preparing a polymer-modified resin, comprising:
free-radical polymerizing ethylenically unsaturated monomers in the presence of a) at least one polyester having at least one hydroxy-functional or carboxy-functional group, and b) at least one organic solvent, to obtain at least one glycidyl-containing polyacrylate; and
wherein said polyester comprises an alcohol component containing of from 0.5 to 80 mol % of dicidol.

26. A binder, comprising:
a polymer-modified resin according to claim 1.

27. An adhesive, comprising:
a polymer-modified resin according to claim 1.

28. A coating composition, comprising:
a polymer-modified resin according to claim 1.

29. The binder as claimed in claim 26, further comprising polyisocyanate, polycarboxylic acid, polyanhydride, polyamine, melamine-formaldehyde resin crosslinker or mixtures thereof.

30. The polymer-modified resin as claimed in claim 5, further comprising up to 10% of isomers of dicidol, trimeric isomeric diols of the Diels-Alder reaction product of cyclopentadiene, higher isomeric diols of the Diels-Alder reaction product of cyclopentadiene or mixtures thereof.

* * * * *